United States Patent
Britton et al.

(10) Patent No.: US 8,751,663 B2
(45) Date of Patent: Jun. 10, 2014

(54) METHOD AND APPARATUS FOR MODIFYING HTTP AT A REMOTE DATA CENTER VIA TUNNELING

(75) Inventors: Zachary Edward Britton, Toulumne, CA (US); Derek Stephen Maxson, Twain Harte, CA (US); Carlos Alberto Vazquez, Chula Vista, CA (US); Thabo Husayn Fletcher, Oakdale, CA (US)

(73) Assignee: Front Porch, Inc., Sonora, CA (US)

( * ) Notice: Subject to any disclaimer, the term of this patent is extended or adjusted under 35 U.S.C. 154(b) by 389 days.

(21) Appl. No.: 12/351,708

(22) Filed: Jan. 9, 2009

(65) Prior Publication Data

US 2009/0204688 A1 Aug. 13, 2009

Related U.S. Application Data

(60) Provisional application No. 61/065,054, filed on Feb. 8, 2008.

(51) Int. Cl.
*G06F 15/16* (2006.01)

(52) U.S. Cl.
USPC ........... 709/227; 709/223; 709/225; 709/229; 370/352

(58) Field of Classification Search
USPC ........................................................ 709/227
See application file for complete search history.

(56) References Cited

U.S. PATENT DOCUMENTS

| | | | |
|---|---|---|---|
| 5,933,811 A * | 8/1999 | Angles et al. ............. | 705/14.56 |
| 6,438,125 B1 * | 8/2002 | Brothers ..................... | 370/352 |
| 6,442,577 B1 | 8/2002 | Britton et al. | |
| 6,832,252 B1 * | 12/2004 | Cieslak et al. ............... | 709/225 |
| 6,845,452 B1 * | 1/2005 | Roddy et al. ................ | 726/11 |
| 7,093,073 B2 * | 8/2006 | Truty ........................... | 711/118 |
| 7,231,661 B1 * | 6/2007 | Villavicencio et al. ...... | 726/4 |
| 7,330,470 B2 * | 2/2008 | Nakazawa et al. .......... | 370/392 |
| 2002/0101848 A1 | 8/2002 | Lee et al. | |
| 2003/0149787 A1 | 8/2003 | Mangan | |
| 2004/0049598 A1 | 3/2004 | Tucker et al. | |
| 2004/0267920 A1 | 12/2004 | Hydrie et al. | |
| 2007/0180147 A1 | 8/2007 | Leigh | |

FOREIGN PATENT DOCUMENTS

| | | | |
|---|---|---|---|
| WO | 2005114449 A2 | 12/2005 | |
| WO | 2009100251 A1 | 8/2009 | |

OTHER PUBLICATIONS

Written Opinion of the International Searching Authority; PCT/US2009/033272; Mar. 25, 2009.
Supplementary European Search Report, Application No. EP 09709016.1 (PCT/US2009/033272), Nov. 5, 2012, 2 pages, European Patent Office, Rijswijk, Netherlands.
European Search Opinion, Application No. EP 09709016.1 (PCT/US2009/033272), Nov. 5, 2012, 3 pages, European Patent Office, Rijswijk, Netherlands.

* cited by examiner

*Primary Examiner* — Hua Fan
(74) *Attorney, Agent, or Firm* — Robroy R. Fawcett

(57) ABSTRACT

Disclosed is a method for targeted web content modification. In the method, a network service provider determines whether a web content request from an internet user station is a first-type request or a second-type request. If the web content request is a first-type request, then the first-type web content request is forwarded to the internet. Otherwise, if the web content request is a second-type request, then the second-type web content request is tunneled to a content modification station. The content modification station selectively responds to the tunneled second-type web content request with a redirection including a modified web content request. The internet user client receives modified web content based on the modified web content request.

32 Claims, 7 Drawing Sheets

| GRE Key | Location | Postal Code | Venue Attributes |
|---|---|---|---|
| 00-11-AA-BB | Joe's Coffee House | 92133 | 1, 5, 6 |
| 00-11-AA-BC | Yosemite Traveler's Inn | 95370 | 1, 3, 5 |
| 00-11-AA-BD | West Shopping Plaza | 91023 | 1, 2 |
| 00-11-AA-BE | City Wireless Network | 95370 | 3, 5 |

| GRE Key | IP Address | Service 1 | Service 2 | Service N |
|---|---|---|---|---|
| 00-11-AA-BB | 67.102.53.123 | Y | N | N |
| 00-11-AA-BC | 52.213.13.2 | N | Y | N |
| 00-11-AA-BD | 46.12.0.12 | N | N | Y |
| 00-11-AA-BE | 88.7.101.16 | Y | Y | Y |

⊞ Frame 5 (160 bytes on wire, 160 bytes captured)
710 ⊞ Ethernet II, Scr: Cisco_3d:f1:89 (00:1e:7a:3d:f1:89), Dst: Cisco_70:a9:c0 (00:30:85:70:a9:c0)
⊟ Internet Protocol, Src: 209.85.173.103 (209.85.173.103), Dst: 75.12.96.226 (75.12.96.226)
    Version: 4
    Header length: 20 bytes
    ⊞ Differentiated Services Field: 0x00 (DSCP 0x00: Default; ECN: 0x00)
    Total Length: 146
    Identification: 0x04b0 (1200)
    ⊞ Flags: 0x04 (Don't Fragment)
    Fragment offset: 0
    Time to live: 48
720    Protocol: TCP (0x06)
    ⊞ Header checksum: 0x1b0b [correct]
    Source: 209.85.173.103 (209.85.173.103)
    Destination: 75.12.96.226 (75.12.96.226)
730 ⊟ Transmission Control Protocol, Src Port: http (80), Dst Port: 49437 (49437), Seq:1, Ack: 664, Len: 106
    Source port: http (80)
    Destination port: 49437 (49437)
740    Sequence number: 1    (relative sequence number)
    [Next sequence number: 107    (relative sequence number)]
    Acknowledgement number: 664    (relative ack number)
    Header length: 20 bytes
    ⊞ Flags: 0x19 (FIN, PSH, ACK)
750    Window size: 94336 (scaled)
    ⊞ Checksum: 0x3d54 [correct]
    ⊞ [SEQ/ACK analysis]
    ⊟ Hypertext Transfer Protocol
760    ⊞ HTTP/1.1 302 Found\r\n
    Location: http://65.160.238.140/PASV/B4A631982C0523A0C679A4BADF18CE82/\r\n
    \r\n
    ⊞ Data (12 bytes)

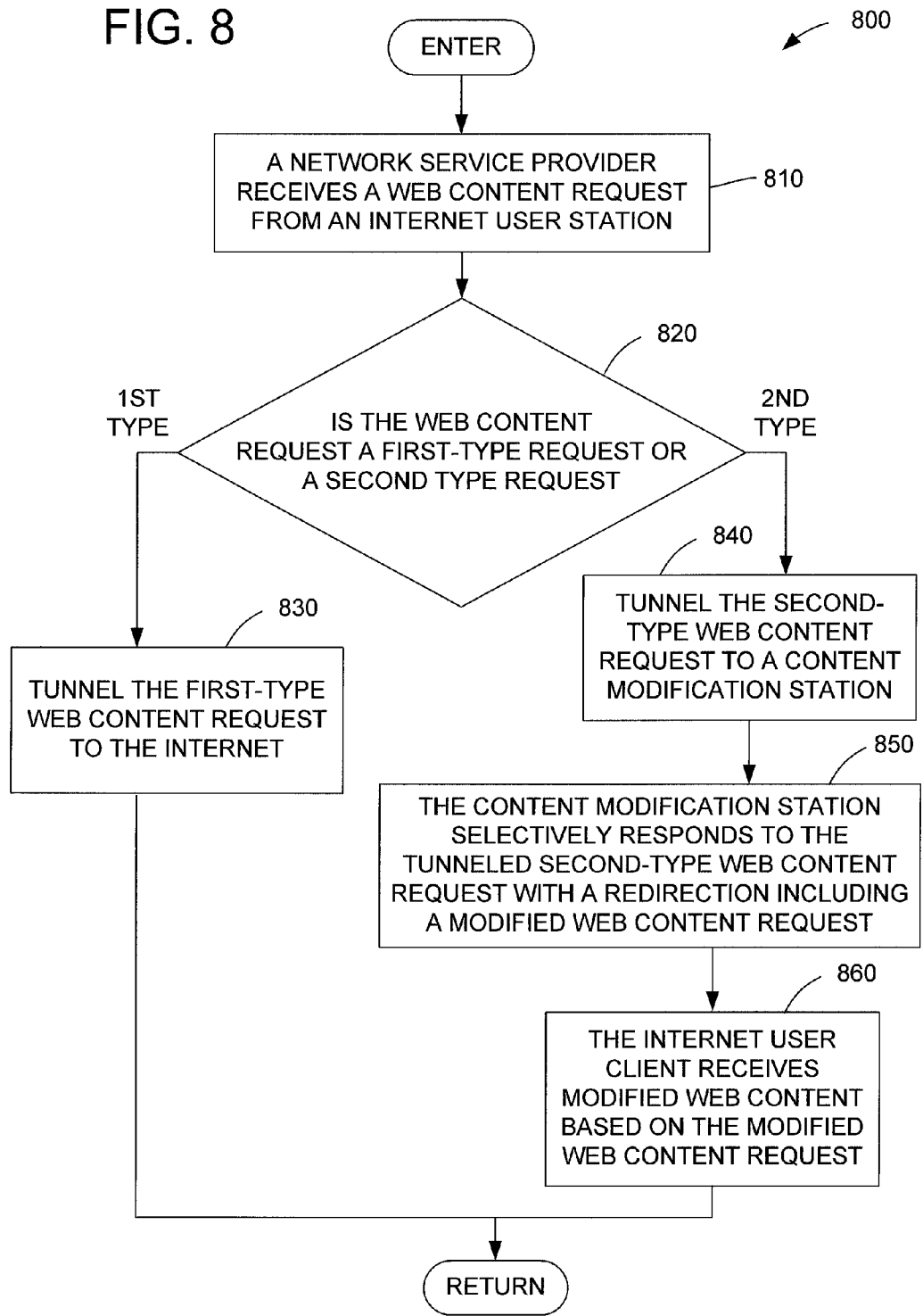

METHOD AND APPARATUS FOR MODIFYING HTTP AT A REMOTE DATA CENTER VIA TUNNELING

CROSS-REFERENCE TO RELATED APPLICATION

This application claims the benefit of U.S. Provisional Application No. 61/065,054, filed on Feb. 8, 2008, which application is incorporated herein by reference.

BACKGROUND OF THE INVENTION

1. Field of the Invention

The present invention relates to providing custom web content, and more particularly, to a method and apparatus for the delivery of custom content to individual computers or users by means of a data center without inducing noticeable latency.

2. Description of the Prior Art and Related Information

Targeting content and advertising to the prior behavior of the individual is an increasingly common and valuable methodology for shaping the user experience. Existing methods may use an intermediate device such as a proxy to insert custom content. However, it may be costly and difficult to install network equipment proxy in relatively small service networks such as small hotels, shopping centers, and public areas Accordingly, there exists a need for providing targeted custom content in an efficient and cost effective manner. The present invention satisfies these needs.

SUMMARY OF THE INVENTION

An aspect of the present invention may reside in a method for targeted web content modification. In the method, a network service provider determines whether a web content request from an internet user station is a first-type request or a second-type request. If the web content request is a first-type request, then the first-type web content request is forwarded to the internet. Otherwise, if the web content request is a second-type request, then the second-type web content request is tunneled to a content modification station. The content modification station selectively responds to the tunneled second-type web content request with a redirection including a modified web content request. The internet user client receives modified web content based on the modified web content request.

In more detailed aspects of the invention, a second-type request may comprise an http request, and a first-type request may exclude an http request. Alternatively, a second-type request may comprise outbound TCP port 80 traffic, and a first-type request may exclude outbound TCP port 80 traffic. Also, a second-type request may comprise a request based on a protocol using metadata, and a first-type request may exclude a request based on a protocol using metadata. Further, the network service provider may tunnel the second-type web content request to the content modification station using the Generic Routing Encapsulation Modification (GRE) protocol. The content modification station may selectively respond to the second-type web content request with a redirection only if the internet user station is a participant in web content modification. The content modification station may forward the second-type web content request to the internet if the internet user station is not a participant in web content modification. Alternatively, the content modification station may discard the second-type web content request if the internet user station is not a participant in web content modification.

In other more detailed aspects of the invention, the redirection may be configured to appear to originate from a target of the web content request from the internet user station. The content modification station may modify the second-type web content request by replacing a request for first content, in the second-type web content request, with a request for second content thereby generating the modified web content request. The second content may comprise an advertisement. Alternatively, the content modification station may modify the second-type web content request by adding a request for second content thereby generating the modified web content request. Further, the network service provider may include an identifier with a second-type web request tunneled to the content modification station so the content modification center can identify the tunneled second-type web request as originating from the network service provider. Also, the internet user station may receive the redirection with the modified content request from the content modification station, send the modified content request to the internet through the network service provider, and receive the modified content based on the modified web content request.

Another aspect of the invention may reside in an apparatus, for targeted web content modification, including a network service provider and a content modification station. The network service station determines whether a web content request from an internet user station is a first-type request or a second-type request, and the network service station forwards the first-type web content request to the internet if the web content request is a first-type request, otherwise the network service station tunnels the second-type web content request to the content modification station. The content modification station selectively responds to the tunneled second-type web content request with a redirection including a modified web content request such that the internet user client receives modified web content based on the modified web content request.

Yet another aspect of the present invention may reside in a computer program product comprising computer readable medium including: code for causing a network service station to determine whether a web content request from an internet user station is a first-type request or a second-type request; code for causing the network service station to forward the first-type web content request to the internet if the web content request is a first-type request, otherwise causing the network service station to tunnel the second-type web content request to a content modification station; code for causing content modification station to selectively respond to the tunneled second-type web content request with a redirection including a modified web content request such that the internet user client receives modified web content based on the modified web content request.

BRIEF DESCRIPTION OF THE DRAWINGS

The accompanying drawings illustrate embodiments of the present invention and, together with the description, serve to explain the principles of the invention.

FIG. 5 is an exemplary key table showing the correlation of service network identification and participation information.

FIG. 6 is an exemplary key resolution table showing the correlation of service network identification, service network location, and associated services.

FIG. 7 is a listing of an exemplary replacement packet as generated by a content modification device.

FIG. 8 is a flowchart illustrating a method for target content modification, according to the present invention.

DETAILED DESCRIPTION

Figure 1:
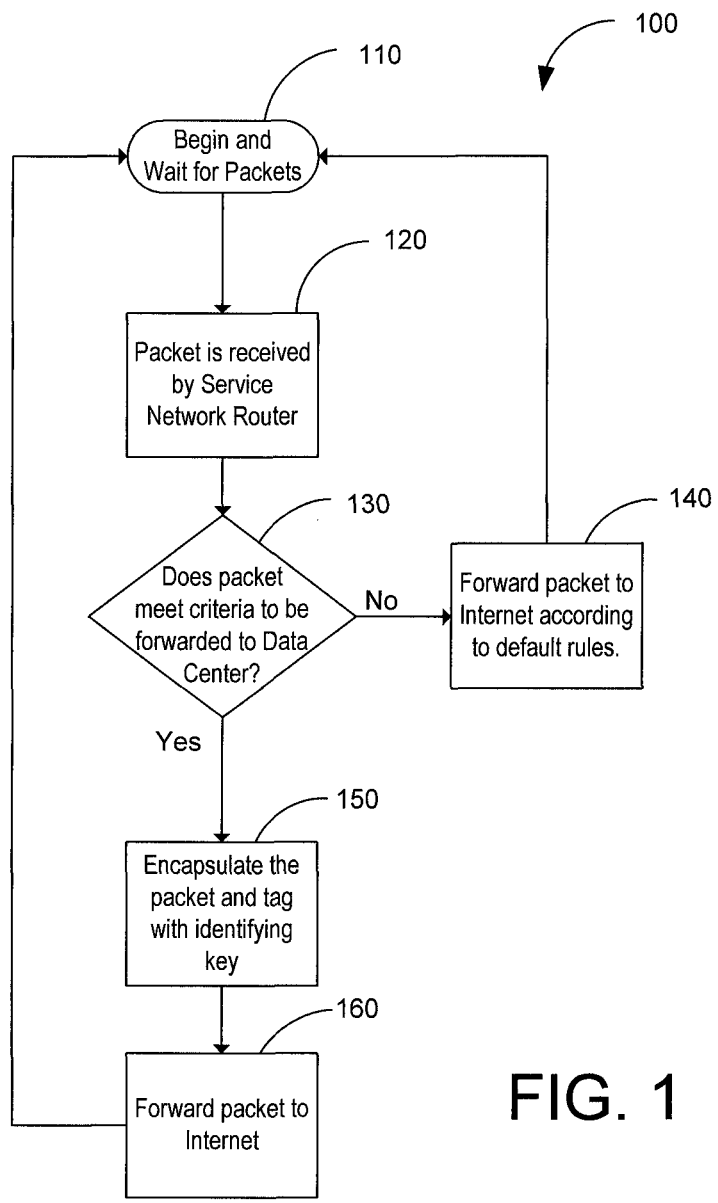
FIG. 1 is a flowchart illustrating a process of establishing the proper routing of packets for a service network.

The present invention provides for the delivery of custom content to individual computers or users by means of a data center without inducing noticeable latency. The present invention leverages the selective use of the open protocol Generic Routing Encapsulation GRE (RFC 1701, etc.) to transmit the HTTP or TCP port 80 packets that originate at the Service Network and are bound for the web servers. These HTTP packets are sent via a GRE tunnel to a data center a content modification device which can modify HTTP traffic during transit. Unmodified packets are forwarded to the Internet for interaction with the original server that was the packets' original destination.

Service networks have used bi-directional tunnels or point-to-point connections to accomplish these purposes but have found drawbacks. Among the drawbacks, service networks have found that it is costly to tunnel traffic to a data center for the purpose of modifying HTTP requests. Bandwidth costs are doubled for the data center provider since all traffic must come in to the data center and then leave out of the data center. Attempts to limit bandwidth usage by tunneling only HTTP traffic may reduce bandwidth consumption and associated costs. However, the data center still bears the cost of the HTTP traffic in both directions. The present invention greatly reduces the costs of bandwidth because only certain outbound traffic from the service network is tunneled to the data center.

Additionally, there is a significant increase of latency induced in tunneling bi-directional traffic. Systems that tunnel or route all traffic, or all HTTP traffic, may add a significant amount of latency, which may be especially noticeable in environments requiring fast response times. The present invention allows all HTTP response traffic to be returned to the user computer or station directly from web servers to the service network, thereby inducing no additional latency for content sent by the web servers.

Research has shown that the HTTP traffic on a typical service network comprises approximately 50% of the total traffic. Further research has shown that approximately 5% of total HTTP traffic is TCP port 80 outbound from the service network, and approximately 95% of the total HTTP traffic is inbound response HTTP traffic. Thus, the present invention allows 97% of the traffic to have no increase in latency. The present invention also reduces the bandwidth costs of the data center network because 97% of the service network's internet traffic is not being handled by the data center network. Instead, 97% of the internet traffic is proceeding directly from the web sites to the user.

All packets that are not TCP port 80 destination are not tunneled but are serviced by the Internet in a standard method.

In order to perform the HTTP modification using only the outbound TCP port 80 traffic tunneled from the service provider, the present invention provides for the analysis of these packets, seeking to find HTTP requests such as GET and POST that represent a user's request for content from a web server. If the content modification device identifies a HTTP request from a user requesting content from a web server, the request or the response may then be modified by the content modification device.

Advantageously, the content modification device will modify the HTTP transaction by sending one or more packets directly to the originating computer and service network by taking on the IP address of the originally-requested web server. The new packet is destined to the originating computer on the service network and appears to be sent from the IP address of the web server. The TCP sequence value (SEQ) is the acknowledgement number from the packet containing the HTTP Request and the TCP acknowledgement value (ACK) is the SEQ of the packet containing the HTTP request plus the length of the TCP data in the spoof frame. The HTTP response in the application layer is a standard HTTP 302 redirection. The redirection can be made to any server containing any content that may be transmitted over HTTP. The content modification device performs this packet insertion very quickly so that the redirection packet arrives prior to the response from the web server.

Identification of the service network is a advantageous feature. GRE allows for a security/identification key. This key is identified by the data center devices to match an IP address with a location. Thus, if a GRE packet with a key ID 01-AE-11-0E, and with an IP address of 64.100.100.1, arrives at the data center, the content Modification device or other similar system will correlate the IP address with the key to correlate the correct location. The use of attributes in the originating request is detailed in U.S. Pat. No. 6,442,577 to Britton et al.

The present invention simplifies the addition of value-added content modification services for the service network by eliminating the need for a content modification device or other mechanism at the network site to modify the HTTP content. The present invention also makes the solution more economical by allowing multiple service networks to share a remotely-located device at a data center capable of modifying HTTP content during transit.

When a computer on the service network makes an HTTP request, a router will use the GRE protocol using the preselected key as an identifier of that network location. The appropriate outgoing packets are forwarded to the data center. At the data center, the key is identified, and the packets are evaluated by the content modification device for modification and optionally forwarded to the destination web server.

The Service Network device may include an identifier in the IP options fields available according to RFC 791. This identifier may include the NAT IP Address (192.168.1.x), the MAC address of the user, or other identifiers according to the need. The preferred embodiment would be to include the GRE Key and the MAC of the user—resulting in a 10 byte value wherein 4 bytes are the GRE Key (indicating the site identification ID) and 6 bytes are the MAC (indicating the unique user at the site). Each frame would be modified at the Service Network with this value. When the frame is read by the present invention, the site ID and the user ID may be used to correctly determine how to modify the HTTP content.

Protocols in addition to HTTP can be handled by the modification device, such as XML, session initiation protocol (SIP), and other protocols using metadata. In addition, the present invention provides for the use of additional tunneling protocols such as Layer 2 Tunneling Protocol (L2TP), or Point-to-Point Tunneling Protocol (PPTP), which have similar attributes.

With reference to FIG. 1, a process 100 establishes the proper routing of packets for a service network of a network service provider. The Internet user is connected to the Internet through a service network (exemplified in FIG. 4). A router at the service network is capable of selectively routing packets through a tunnel to a data center or content modification center (exemplified in FIG. 4). The Internet user generates a request for content from a remotely located server such as an HTTP request for a web page.

At step 110, the router device (420) is waiting to receive packet. At step 120, the router has received a packet that must be routed. At step 130, the routing device inspects the packet to determine if the packet meets certain rules for being routed via the tunnel. If the rules match, then the packet is sent over the tunnel (440). If there is not a match, the packet is sent to the gateway to the internet (450) according to its routing rules. At step 140, packets destined for other routing are handled according to the default routing conditions. Flow proceeds back to 110. At step 150, the matching packet is encapsulated and tagged with the appropriate key for identification by the data center network. At step 160, the matching packet, having been encapsulated, is forwarded to the Internet. Flow then proceeds back to 110.

Figure 2:
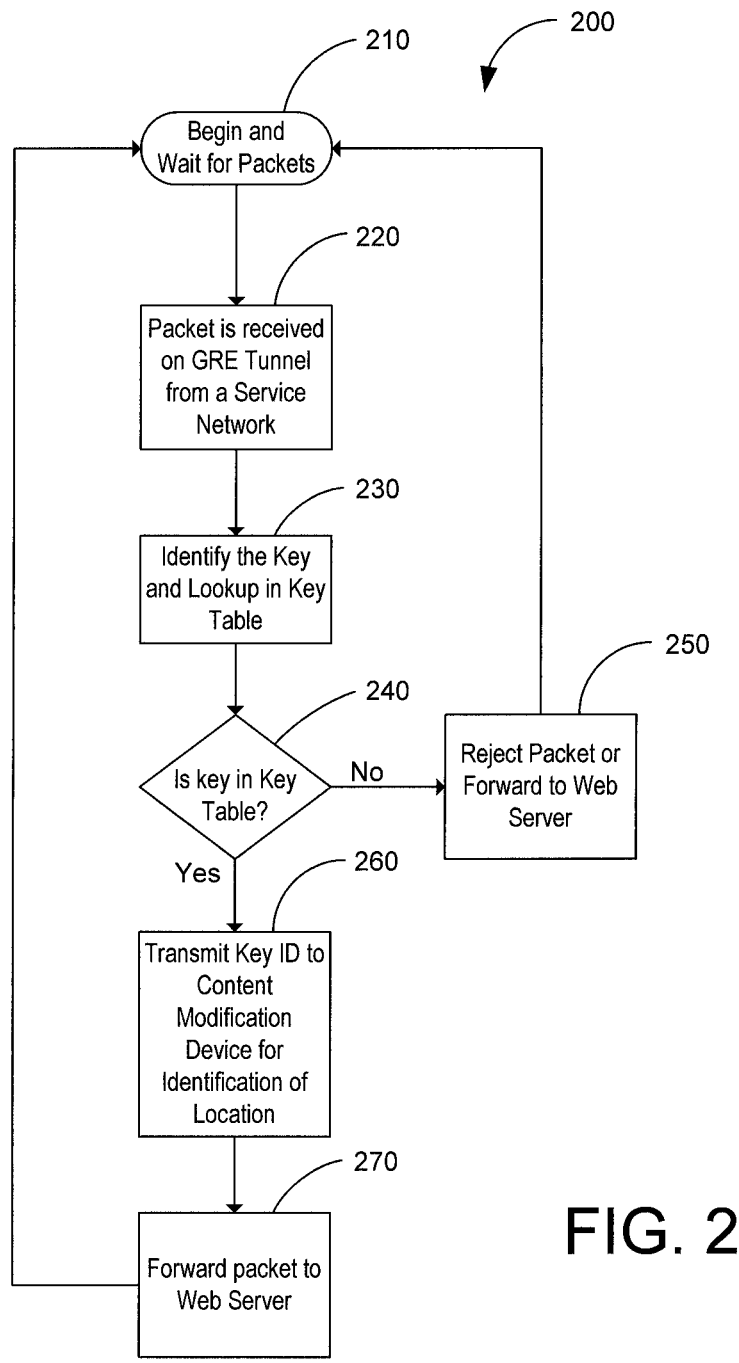
FIG. 2 is a flowchart illustrating a process of receiving and handling the packets at a data center from a service network over a tunneled connection.

With reference to FIG. 2, a process 200 handles receiving packets from the service network over the tunneled connection. The data center is connected to the Internet in such a way as to be capable of receiving tunneled packets from one or more service networks (exemplified in FIG. 4) that utilize the invention. A content modification device is able to modify or replace HTTP requests or responses.

Figure 3:
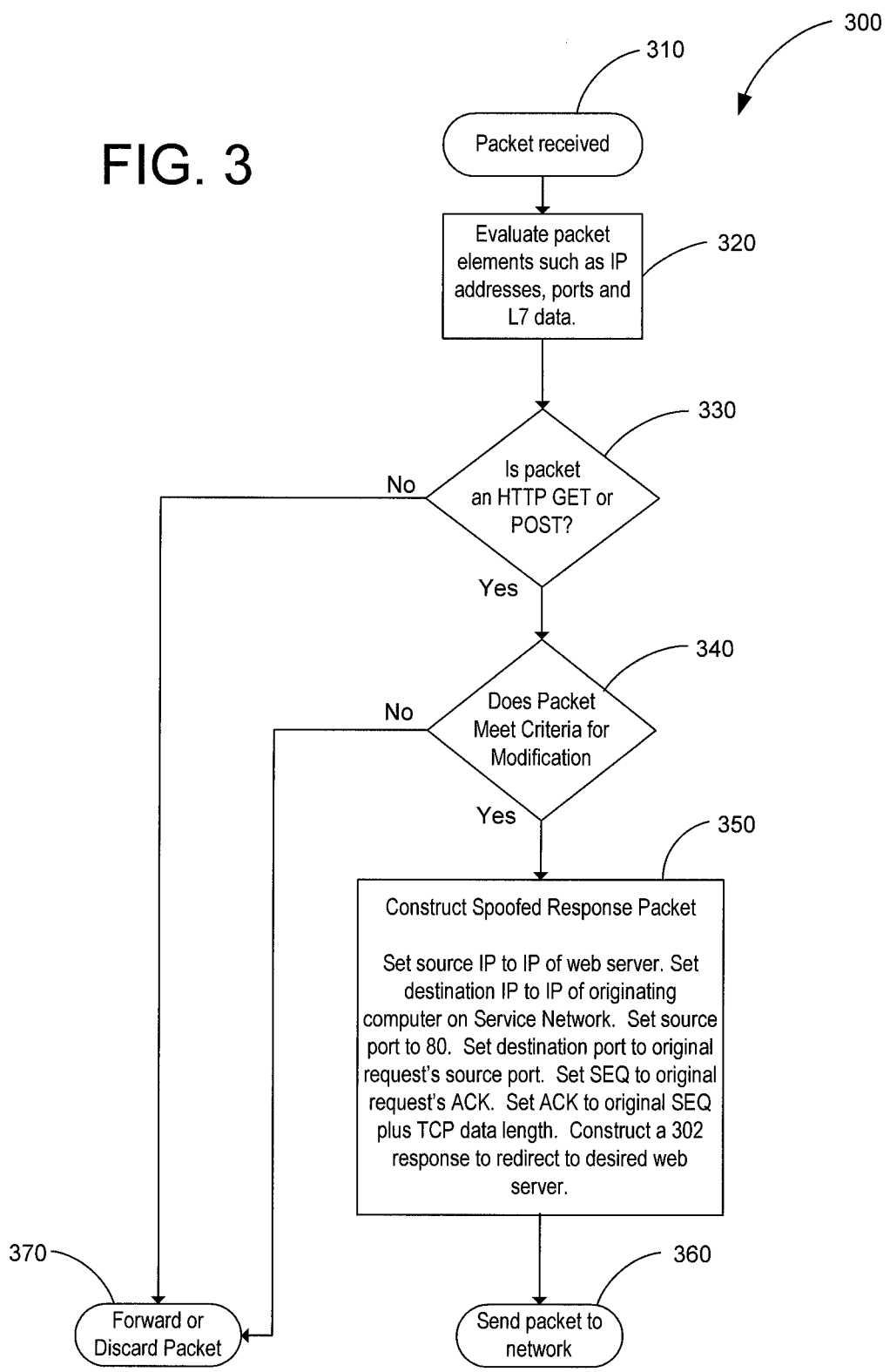
FIG. 3 is a flowchart illustrating a process of modifying http packets at a data center.

At step 210, a decapsulating router (470) is awaiting a packet to be delivered from a service network through the tunnel. At step 220, the packet is received. At step 230, the key or other identifier is referenced against a key lookup table (FIG. 5). At step 240, if the key matches an entry in the key table, the packet is sent to step 260. Alternatively if the business rules for the network dictate, all received packets may be sent to step 260, even if they do not match an entry in the key lookup table. At step 250, the key does not match and the packet may be disposed or forwarded back to the Internet depending upon network operator business conditions. Flow of the application proceeds back to step 210. At step 260, the application will notify a content modification device (480) of the identity of packets on a given IP address corresponds to a certain service network as illustrated in FIGS. 3 and 6. At step 270, the packet is decapsulated and forwarded on the data center network to the Internet in such a way that the web server will be the ultimate destination of the packet.

With reference to FIG. 3, a process 300 handles a process of modifying HTTP packets. At step 310, an HTTP packet is received by the content modification (480). At step 320, the packet is examined to determine network elements such as IP addresses, ports, http or application header and data, or similar L7 data. At step 330, if the packet is an HTTP GET or POST request, the packet is sent to step 340. If the packet is neither a HTTP GET nor a HTTP POST, the packet is sent to step 370. At step 340, the packet is examined to determine if it meets criteria for HTTP modification. If the modification rules are met, the packet is pushed to step 350. If the rules are not met, the packet is sent to step 370. At step 350, a spoofed response packet is constructed according to the present invention. A 302 response to redirect to a desired web server is then encapsulated in the packet routing information and sent to step 360. At step 360, the spoofed packet is sent back onto the network to be delivered to the requester. At step 370, the packet did not meet one of the modification criteria and is forwarded or discarded according to the network routing rules.

Figure 4:
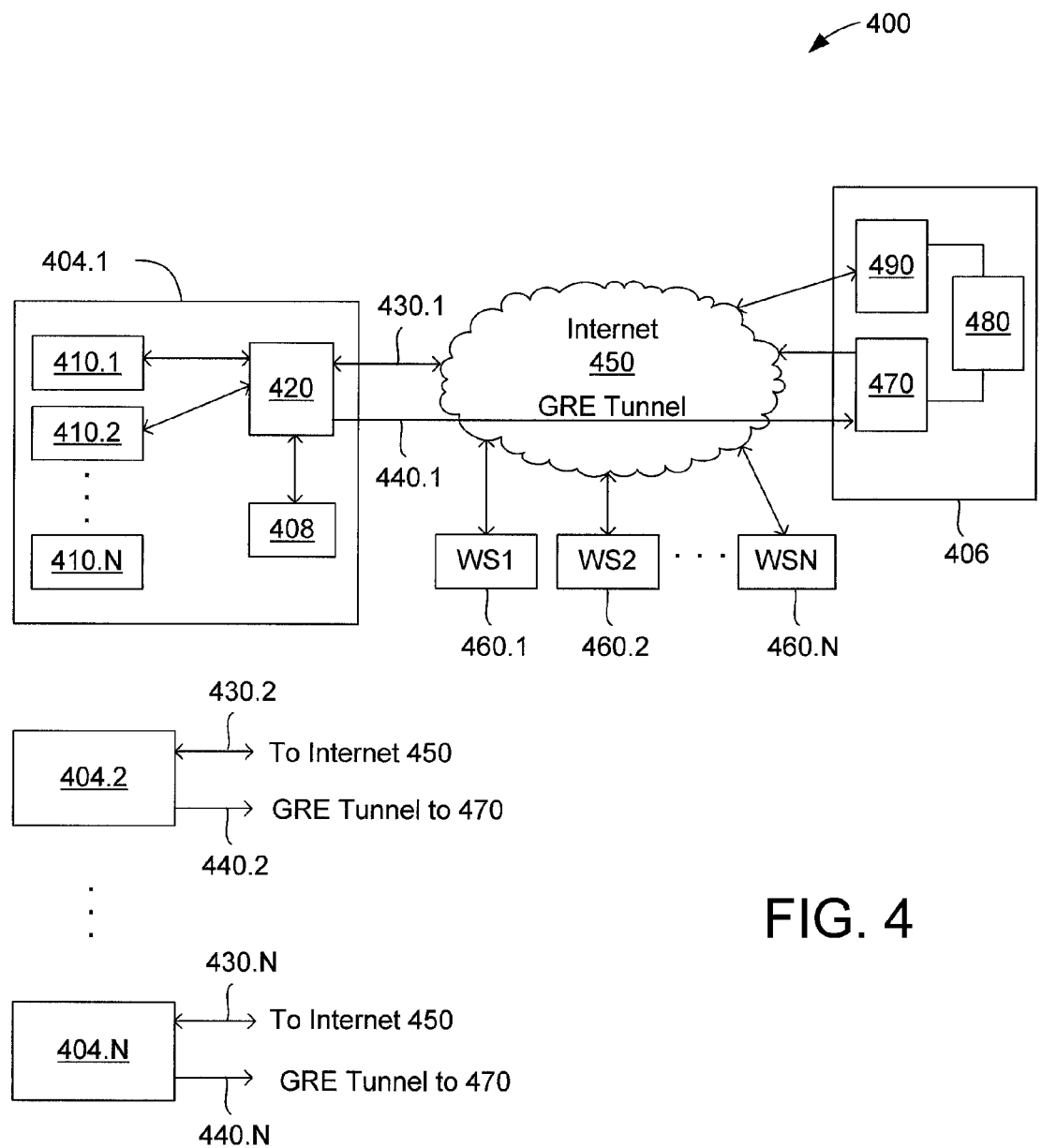
FIG. 4 is a block diagram illustrating an exemplary network system to facilitate packet flow according to the present invention.

FIG. 4 shows an exemplary network 400 to facilitate the packet flow according to the present invention. Though networks may have varied constructions according to the specific needs of the network, only the elements require for describing the invention are included in the drawing.

One or more network capable devices or internet user stations 410.1 to 410.N, such as a computer, a mobile device, a phone, or media player, are connected to the service network of a network service provider 404.N. A router 420, such as a NAT router, is configured to make packet routing decisions according to protocol, port and IP Address. A standard Internet connection 430 is provided for the packets that will not be tunneled. A GRE or similar tunnel 440 may be used to send packets directly to a data center or content modification station 406. It is understood that a tunnel will be facilitated by a standard Internet connection (such as 430) and that it is illustrated as a separate path for the purpose of describing the invention. The Internet 450 routes packets according to its established methods. A content server, such as a web server 460.N is capable of receiving the packets after being handled by the data center. A decapsulating router 470 draws packets from the tunnel and broadcasts them onto the data center network. A content modification device 480, proxy, content switch or other intermediary that is capable of replacing or modifying either the web request or web response evaluates each packet for possible replacement or modification according to parameters of the request or response. A gateway router 490 sends the packets to the Internet 450 according to the default routing rules so that the packets received by the data center may be forwarded to a web server 460.N.

FIG. 5 illustrates an exemplary key table database 500 for storing service network identification and participation information. Use of this database is optional, as noted in the description for FIG. 2. The participant database 500 has a GRE key field, 510, containing the key or similar network identifier that is used to identify the source Service Network; a customer field, 520, detailing which customer that the traffic is from; a postal code field, 530, indicating the location of the network; and a venue attributes field, 540, indicating customizable set of attributes that apply to an given service network.

FIG. 6 illustrates an exemplary key resolution table database 600 for storing service network identification, service network location, and associated services. The participant database 600 has a key field, 610, containing the key or similar network identifier that is used to identify the source service network; an IP address, 620, identifying a specific device on the service network; and multiple boolean fields, 630.1-630.N, identifying available services on the specified device.

FIG. 7 is a listing of an exemplary replacement packet as generated by the content modification device. An IP header 710 is modified wherein the source address is the IP address of the server that was the destination of the original request. The destination address is set to the IP address of the originating computer device. Other necessary IP headers 720 are modified such that options and checksum are properly set according to standard Internet Protocol (RFC 791). TCP headers 730 are modified wherein the source port is set to the port destined in the original request. The destination port is set to the source port of the original request. The TCP SEQ and ACK numbers 740 are modified wherein these values are set according to Transmission Control Protocol (RFC 675, et. al.). A TCP Checksum 750 is calculated according to standard Transmission Control Protocol. An HTTP response 760 is modified wherein a redirection to a different HTTP destination is sent to the user's computer causing the computer to generate a new HTTP request for this new content, completing the modification.

The present invention enables a service network to utilize advanced content replacement and modification technologies without the need for expensive equipment to be installed at the site and without excessive packet redirection. It allows the data center to provide a complete solution from a data center where costs of deployment, administration and maintenance may be minimal. Further, it provides for the use of revenue generation and service improvements to be provided to the service network. This is accomplished through a novel approach to filtering and tunneling packets from the service network to the data center and with the novel use of a content modification device capable of replacing and modifying content.

With reference to FIG. 8, one aspect of the present invention may reside in a method 800 for targeted web content modification. In the method, a network service provider 404 receives a web content request (step 810) and determines whether a web content request from an internet user station 410 is a first-type request or a second-type request (step 820). If the web content request is a first-type request, then the first-type web content request is forwarded to the internet (step 830). Otherwise, if the web content request is a second-type request, then the second-type web content request is tunneled to a content modification station 406 via a tunnel 440 (step 840). The content modification station selectively responds to the tunneled second-type web content request with a redirection including a modified web content request 700 (step 850). The internet user client receives modified web content based on the modified web content request (step 860).

Another aspect of the invention may reside in an apparatus (FIG. 4) including a service network of a network service provider 404 having a router/gateway/wireless access point 420 and internet user stations 410, and a content modification station 406 having a decapsulating router 470, content modification device 480, and gateway router 490, for implementing the method 800 (FIG. 8). Yet another aspect of the invention may reside in a computer program product comprising computer readable medium (such as a memory device 408 or hard drive of an service network 404) comprising code for causing a computer to cause the apparatus to perform the steps of the method 800.

Also, the present invention may often provide a method to allow network administrators to provide content modification services in an expedited manner which could be necessary. The present invention provides a method by which a portion of the data stream may be tunneled to a data center to provide the services in a simple and cost-effective manner.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for targeted web content modification, comprising:
   a network service provider determining whether a web content request from an internet user station is a first-type request or a second-type request;
   if the web content request is a first-type request, then forwarding the first-type web content request to the internet;
   otherwise, if the web content request is a second-type request, then:
   tunneling the second-type web content request to a content modification station, wherein a one-directional tunnel is used for tunneling the second-type content request to the content modification station; and
   if the tunneled second-type web content request meets a criteria for modification, the content modification station responding to the tunneled second-type web content request by forwarding to the internet user station a redirection for causing the internet user station to send a new web content request to the internet wherein the internet user station receives modified web content based on the new web content request, and
   otherwise, if the tunneled second-type web content request does not meet a criteria for modification, the content modification station forwarding the tunneled second-type web content request wherein the internet user station receives requested web content, directly from the internet and not from the content modification station, based on the tunneled second-type web content request.

2. A method for targeted web content modification as defined in claim 1, wherein a second-type request comprises an http request, and a first-type request excludes an http request.

3. A method for targeted web content modification as defined in claim 1, wherein the network service provider tunnels the second-type web content request to the content modification station using the Generic Routing Encapsulation (GRE) protocol.

4. A method for targeted web content modification as defined in claim 1, wherein the content modification station responds to the second-type web content request with a redirection only if the internet user station is a participant in web content modification.

5. A method for targeted web content modification as defined in claim 4, wherein the content modification station forwards the second-type web content request to the internet if the internet user station is not a participant in web content modification.

6. A method for targeted web content modification as defined in claim 4, wherein the content modification station discards the second-type web content request if the internet user station is not a participant in web content modification.

7. A method for targeted web content modification as defined in claim 1, wherein the redirection is configured to appear to originate from a target of the web content request from the internet user station.

8. A method for targeted web content modification as defined in claim 1, wherein a second-type request comprises outbound TCP port 80 traffic, and a first-type request excludes outbound TCP port 80 traffic.

9. A method for targeted web content modification as defined in claim 1, wherein a second-type request comprises a request based on a protocol using metadata, and a first-type request excludes a request based on a protocol using metadata.

10. A method for targeted web content modification as defined in claim 1, wherein the content modification station modifies the second-type web content request by replacing a request for first content, in the second-type web content request, with a request for second content thereby generating the new web content request.

11. A method for targeted web content modification as defined in claim 10, wherein the second content comprises an advertisement.

12. A method for targeted web content modification as defined in claim 1, wherein the content modification station modifies the second-type web content request by adding a request for second content thereby generating the new web content request.

13. A method for targeted web content modification as defined in claim 1, wherein the network service provider includes an identifier with the second-type web content request tunneled to the content modification station so the content modification station can identify the tunneled second-type web content request as originating from the network service provider.

14. A method for targeted web content modification as defined in claim 1, wherein the internet user station receives the redirection with the new web content request from the content modification station, sends the new web content request to the internet through the network service provider, and receives the modified web content based on the new web content request.

15. An apparatus for targeted web content modification, comprising:
   a network service provider; and a content modification station; wherein the network service provider determines whether a web content request from an internet user station is a first-type request or a second-type request, and the network service provider forwards the first-type web content request to the internet if the web content request is a first-type request, otherwise the network service provider tunnels the second-type web content request to the content modification station, wherein a one-directional tunnel is used for tunneling the second-type content request to the content modification station; and
   wherein, if the tunneled second-type web content request meets a criteria for modification, the content modification station responds to the tunneled second-type web content request by forwarding to the internet user station a redirection causing the internet user station to send a new web content request to the internet wherein the internet user station receives modified web content based on the new web content request, and otherwise, if the tunneled second-type web content request does not meet a criteria for modification, the content modification station forwards the tunneled second-type web content request wherein the internet user station receives requested web content, directly from the internet and not from the content modification station, based on the tunneled second-type web content request.

16. An apparatus for targeted web content modification as defined in claim 15, wherein a second-type request comprises an http request, and a first-type request excludes an http request.

17. An apparatus for targeted web content modification as defined in claim 15, wherein the network service provider tunnels the second-type web content request to the content modification station using the Generic Routing Encapsulation (GRE) protocol.

18. An apparatus for targeted web content modification as defined in claim 15, wherein the content modification station responds to the second-type web content request with a redirection only if the internet user station is a participant in web content modification.

19. An apparatus for targeted web content modification as defined in claim 18, wherein the content modification station forwards the second-type web content request to the internet if the internet user station is not a participant in web content modification.

20. An apparatus for targeted web content modification as defined in claim 18, wherein the content modification station discards the second-type web content request if the internet user station is not a participant in web content modification.

21. An apparatus for targeted web content modification as defined in claim 15, wherein the redirection is configured to appear to originate from a target of the web content request from the internet user station.

22. An apparatus for targeted web content modification as defined in claim 15, wherein a second-type request comprises outbound TCP port 80 traffic, and a first-type request excludes outbound TCP port 80 traffic.

23. An apparatus for targeted web content modification as defined in claim 15, wherein a second-type request comprises a request based on a protocol using metadata, and a first-type request excludes a request based on a protocol using metadata.

24. An apparatus for targeted web content modification as defined in claim 15, wherein the content modification station modifies the second-type web content request by replacing a request for first content, in the second-type web content request, with a request for second content thereby generating the new web content request.

25. An apparatus for targeted web content modification as defined in claim 24, wherein the second content comprises an advertisement.

26. An apparatus for targeted web content modification as defined in claim 15, wherein the content modification station modifies the second-type web content request by adding a request for second content thereby generating the new web content request.

27. An apparatus for targeted web content modification as defined in claim 15, wherein the network service provider includes an identifier with the second-type web content request tunneled to the content modification station so the content modification station can identify the tunneled second-type web content request as originating from the network service provider.

28. An apparatus for targeted web content modification as defined in claim 15, wherein the internet user station receives the redirection with the new web content request from the content modification station, sends the new web content request to the internet through the network service provider, and receives the modified web content based on the new web content request.

29. A computer program product, comprising:
non-transitory computer readable medium including:
code for causing a network service station to determine whether a web content request from an internet user station is a first-type request or a second-type request;
code for causing the network service station to forward the first-type web content request to the internet if the web content request is a first-type request, otherwise causing the network service station to tunnel the second-type web content request to a content modification station, wherein a one-directional tunnel is used for tunneling the second-type content request to the content modification station;
code for causing the content modification station to respond to the tunneled second-type web content request, if the tunneled second-type web content request meets a criteria for modification, by forwarding to the internet user station a redirection for causing the internet user station to send the modified web content request to the internet wherein the internet user station receives modified web content based on the new web content request; and
code for causing the content modification station, if the tunneled second-type web content request does not meet a criteria for modification, to forward the tunneled second-type web content request wherein the internet user station receives requested web content, directly from the internet and not from the content modification station, based on the tunneled second-type web content request.

30. A computer program product as defined in claim 29, wherein a second-type request comprises an http request, and a first-type request excludes an http request.

31. A computer program product as defined in claim 29, wherein a second-type request comprises outbound TCP port 80 traffic, and a first-type request excludes outbound TCP port 80 traffic.

32. A computer program product as defined in claim 29, wherein a second-type request comprises a request based on a protocol using metadata, and a first-type request excludes a request based on a protocol using metadata.

* * * * *